United States Patent Office 3,278,397
Patented Oct. 11, 1966

3,278,397
REMOVAL OF HCl FROM VINYL CHLORIDE BY DISTILLATION IN THE PRESENCE OF STYRENE OXIDE AND A PYRIDINE
Jerry L. Price, Texas City, Tex., assignor to Monsanto Company, St. Louis, Mo., a corporation of Delaware
No Drawing. Filed July 18, 1963, Ser. No. 296,079
3 Claims. (Cl. 203—6)

This invention relates to the purification of vinyl chloride and, more particularly, to the removal of minor amounts of HCl therefrom.

Vinyl chloride is one of the important monomers of commerce. It is used extensively in the production of synthetic resins or plastics either as a homogeneous polymer or as a constituent of a number of copolymers and/or interpolymers with other polymerizable compounds. To qualify for such use, the monomer product must have an extremely high purity. Otherwise, in the usual polymerization methods, the rate of polymerization is seriously decreased and the quality of the polymerization product may be adversely affected. Decreased polymerization rates, for example, directly affect production rates in the same order since many of the polymerization processes are batch operations where the time element is an essential factor in setting up and meeting production schedules. The presence of HCl, which is a common impurity in vinyl chloride, even in quantities as small as ten parts per million parts of vinyl chloride, is particularly undesirable because it causes development of a yellow color in the monomer which is subsequently carried over to the polymer. This impurity also gives rise to problems in the polymerization cycle because of the necessity for rigid control of pH in the polymerization reaction in order to produce polymer having the desired physical properties, particularly with regard to particle size. Thus, it is highly desirable to produce vinyl chloride substantially free of HCl, i.e., containing less than one part per million of HCl.

The usual methods of purification such as fractional distillation do not remove HCl satisfactorily and, hence, some sort of additional treatment is required to provide vinyl chloride monomer which will meet the rigid specifications with respect to this impurity. Such treatments include, for example, washing or scrubbing the vinyl chloride in the vapor phase with an aqueous caustic solution or passing the monomer in the liquid phase through a solid caustic scrubber. Adequate removal by the latter method becomes prohibitively expensive because of the size of the beds required for efficient removal or the necessity for loading such a scrubber with other reactants and/or adsorbents. Also, particles of solid caustic may become entrained with a deleterious effect on polymer properties such as electrical resistivity. The wet caustic wash is efficient but when this method is used, the vinyl chloride must be subjected to an after-treatment for drying which is both time-consuming and costly. Also, any additional steps after purification by distillation provides good chances of again contaminating the vinyl chloride.

Recently, it has been determined that epoxy compounds are effective HCl scavengers in the fractional distillation of vinyl chloride containing minor amounts of HCl. When vinyl chloride contaminated with minor amount of HCl is distilled in the presence of styrene oxide, for example, a product substantially free from HCl can be obtained, whereas in the absence of the oxide, substantial elimination of the HCl is not possible. However, in practice, larger quantities of styrene oxide than are necessary to remove the HCl effectively are required because isomerization of styrene oxide to phenyl acetaldehyde occurs in the column, particularly in the reboiler section. The isomerization reaction is induced or accelerated by the presence of iron chloride which frequently is to be found in fractionation columns wherein HCl is generated. Thus, excess amounts of styrene oxide are required because of the amounts lost in the isomerization reaction in the continuous operation of the column. Since this compound is relatively expensive, such losses are significant. It has now been discovered that the addition of a minor amount of pyridine to styrene oxide prior to the addition of the styrene oxide to the fractionating column markedly reduces or inhibits the isomerization rate and thus permits the use of much smaller amounts of styrene oxide than would otherwise be required.

It is an object of the present invention, therefore, to provide an improved method of obtaining vinyl chloride of extremely high purity.

It is a further object of the invention to provide a method for purification of vinyl chloride containing impurities which cannot be readily removed by distillation.

It is a specific object of the invention to provide a process for the removal of minor amounts of HCl from vinyl chloride.

These and other objects and advantages of the invention which will become apparent from the following description thereof are attained by subjecting vinyl chloride containing minor amounts of HCl to fractional distillation in the presence of styrene oxide in admixture with a minor amount of pyridine or an alkyl pyridine.

In the preferred embodiment of the invention, the pyridine or alkyl pyridine is added to styrene oxide or to a solution of the styrene oxide in a suitable solvent and the mixture is fed to the fractionating column at a point at least several trays above the point at which the vinyl chloride is introduced. The rising vinyl chloride containing HCl is scrubbed by the styrene oxide-pyridine mixture descending the column and is withdrawn overhead substantially free of HCl. The chlorohydrin formed continues down the column together with any unreacted styrene oxide and pyridine compound and these compounds are ejected from the system in the bottoms stream. The process is readily operated on a continuous basis and can be easily controlled to insure that only the minimum amount of styrene oxide required to maintain HCl at the desired level is added. Also, the presence of pyridine in the system appears to inhibit to a significant extent the formation of polymer which ordinarily occurs in this type of fractionation operation.

The process of the invention is illustrated in the following examples which, however, are not to be construed as limiting it in any manner whatsoever.

*Example 1*

A stream containing approximately 98% vinyl chloride and minor amounts of chlorinated organic compounds such as chloropropylene, dichloroethylene, chlorobutadiene, dichloroethane, and trichloroethane, and butadiene together with from about 5 to about 10 p.p.m. of HCl was fed continuously into the lower section of a conventional fractionation column containing about 50 trays of the sieve type. The column was operated at an overhead pressure between about 120 and 130 p.s.i.a., at overhead and bottom temperatures of about 50° and 75° C., respectively, and with a reflux ratio of 1:1. Styrene oxide was introduced continuously into the column at a point about six trays above the feed to the column at a rate from about 300 to about 350 parts of styrene oxide per million parts of feed. Substantially pure vinyl chloride was continuously withdrawn overhead while the other components of the feed stream were continuously removed from the bottom of the column. After operation over a period of several days, samples of the overhead product, the bottoms product, and the product from a tray in the lower section of the column were withdrawn and analyzed for styrene oxide and phenyl acetaldehyde, and in the case of the overhead product for HCl. The overhead product contained less than 1 p.p.m. of HCl indicating that this impurity was being effectively removed by the styrene oxide. However, the styrene oxide and phenyl acetaldehyde content of the bottoms product, 0.28% and 0.21% by weight, respectively, demonstrated that significant amounts of styrene oxide were being converted to phenyl acetaldehyde in the reboiler, the weight ratio of these two compounds being about 1:1. Analyses of the tray product showing 0.047% styrene oxide and 0.0062% by weight of phenyl acetaldehyde confirmed that much of the styrene oxide was being converted to phenyl acetaldehyde in the column.

*Example 2*

Distillation of the same vinyl chloride feed of Example 1 was continued under the same operating conditions except that about 1% by weight of pyridine was added to the styrene oxide introduced and the rate of introduction of styrene oxide was reduced to about 200 parts per million parts of feed. Samples of the overhead stream, the bottoms stream and the product from a tray in the lower section of the column were taken periodically over a period of several days and analyzed for styrene oxide, phenyl acetaldehyde, and HCl as in Example 1. The data obtained are tabulated below. From these it will be seen that the addition of pyridine significantly inhibits the conversion of styrene oxide to phenyl acetaldehyde in the column and in the reboiler. Without pyridine present, the ratio of styrene oxide to phenyl acetaldehyde in the bottoms stream is approximately 1:1. With pyridine present, even with smaller amounts of styrene oxide fed, this ratio in the reboiler is increased to 8:1. Likewise, in the lower section of the column, the ratio of styrene oxide to phenyl acetaldehyde is increased steadily from 7:1 when no pyridine is employed to approximately 16:1 when pyridine is used. At the same time, as indicated by the overhead samples, HCl is effectively eliminated in both instances to a level of less than 1 p.p.m. However, when pyridine is added with the styrene oxide less of the latter additive is required to obtain this level of efficiency in removal of HCl.

| Sample | Styrene Oxide (200 parts per million parts of vinyl chloride feed) +1% (Wt.) Pyridine Added | | | |
|---|---|---|---|---|
| | Elapsed Time (hr.) | Styrene Oxide (Wt. Percent) | Phenyl Acetaldehyde (Wt. Percent) | HCl (p.p.m.) |
| Overhead | 17.5 | None | None | <1 |
| | 41.5 | 0.1 p.p.m. (est.) | None | <1 |
| Bottoms | 4 | 0.21 | 0.26 | |
| | 17.5 | 0.382 | 0.197 | |
| | 41.5 | 0.362 | 0.075 | |
| | 68.5 | 0.823 | 0.110 | |
| Tray | 4 | 0.0068 | 0.0008 | |
| | 17.5 | 0.0066 | 0.0012 | |
| | 41.5 | 0.0085 | 0.0011 | |
| | 68.5 | 0.0204 | 0.0020 | |
| | 91.75 | 0.0190 | 0.0012 | |

The amount of styrene oxide to be added in the distillation column will vary depending upon the HCl content of the material being purified and the desired level of removal of HCl. In order to effect most efficient removal of substantially all of the HCl present, the styrene oxide is fed to the column in which the vinyl chloride monomer contaminated with HCl is being distilled in an amount sufficient to provide a one- to 20-fold molar excess over the amount of HCl to be removed. Preferably, the mole ratio of styrene oxide to HCl is maintained from about 2:1 to about 10:1.

The addition of from about 0.5% to about 10% by weight of pyridine to the styrene oxide will prevent losses of styrene oxide and thus provide for efficient removal of HCl at lower levels of concentration of styrene oxide. Preferably, from about 0.5 to about 1% by weight of pyridine is added with the styrene oxide. In addition to pyridine itself, alkyl-substituted pyridines such as methyl pyridine, ethyl pyridine, dimethyl pyridine, methyl ethyl pyridine, propyl pyridine, diisopropyl pyridine, ethyl propyl pyridine, and the like can be employed with satisfactory results.

What is claimed is:

1. An improved process for purifying vinyl chloride containing minor amounts of HCl as an impurity which comprises distilling said vinyl chloride in the presence of styrene oxide containing admixed therewith a minor amount of a compound chosen from the group consisting of pyridine and alkyl-substituted pyridines and recovering vinyl chloride substantially free of HCl.

2. An improved process for purifying vinyl chloride containing minor amounts of HCl as an impurity which comprises introducing said vinyl chloride into the lower section of a fractional distallation column, introducing styrene oxide containing admixed therewith from about 0.5% to about 10% by weight of a compound chosen from the group consisting of pyridine and alkyl-substituted pyridines into the intermediate section of said distillation column, the amount of said styrene oxide being such as to provide a mole ratio of styrene oxide to HCl within the range from about 1:1 to about 20:1, and recovering said vinyl chloride overhead by distillation from said column substantially free of HCl.

3. The process of purifying vinyl chloride containing minor amounts of HCl as an impurity which comprises introducing said vinyl chloride into the lower section of a fractional distillation column, introducing styrene oxide containing admixed therewith from about 0.5% to about 1% of pyridine into the intermediate section of said distillation column, the amount of styrene oxide being such as to provide a mole ratio of styrene oxide to HCl within the range from about 2:1 to about 10:1, and recovering said vinyl chloride overhead by distillation from said column susbtantially free of HCl.

References Cited by the Examiner
UNITED STATES PATENTS

| 2,371,645 | 3/1945 | Aitchison et al. | 260—652.5 |
| 2,564,194 | 8/1951 | Nie et al. | 260—652.5 |
| 2,875,586 | 3/1959 | Pohl. | |
| 2,887,516 | 5/1959 | Ferri et al. | 260—652.5 |
| 2,973,392 | 2/1961 | Graham | 260—652.5 |
| 3,043,888 | 7/1962 | Pray et al. | 260—652.5 |

NORMAN YUDKOFF, *Primary Examiner.*

W. L. BASCOMB, *Examiner.*